United States Patent [19]

Mitchell et al.

[11] 4,266,454
[45] May 12, 1981

[54] METHOD AND APPARATUS FOR DAMPENING VIBRATIONS DURING TURNING OF A ROTOR

[75] Inventors: Wallace F. Mitchell, Mettawa; Arthur Kamin, Lake Villa, both of Ill.

[73] Assignee: Ammco Tools, Inc., North Chicago, Ill.

[21] Appl. No.: 944,410

[22] Filed: Sep. 21, 1978

[51] Int. Cl.³ .............................................. B23B 1/00
[52] U.S. Cl. ...................................... 82/1 C; 82/4 A; 188/1 B
[58] Field of Search ................. 82/1 C, 4 A, DIG. 9; 188/1 B, 218 A; 51/132; 83/169; 74/574

[56] References Cited

U.S. PATENT DOCUMENTS

| 1,358,971 | 11/1920 | Mohr | 83/169 |
| 3,174,257 | 3/1965 | Maki | 82/48 |
| 3,378,115 | 4/1968 | Stephens | 188/218 A |
| 3,691,878 | 9/1972 | Mitchell | 82/4 A |
| 3,710,661 | 1/1973 | Mitchell | 82/4 A |

FOREIGN PATENT DOCUMENTS 468711  1/1976  U.S.S.R. ............................ 82/DIG. 9

Primary Examiner—Leonidas Vlachos
Attorney, Agent, or Firm—Edmond T. patnaude

[57] ABSTRACT

Vibration of a rotating disc is dampened by means of a pair of weights which respectively lie in inclined tracks and are held against the opposite faces of the disc by the force of gravity.

11 Claims, 3 Drawing Figures

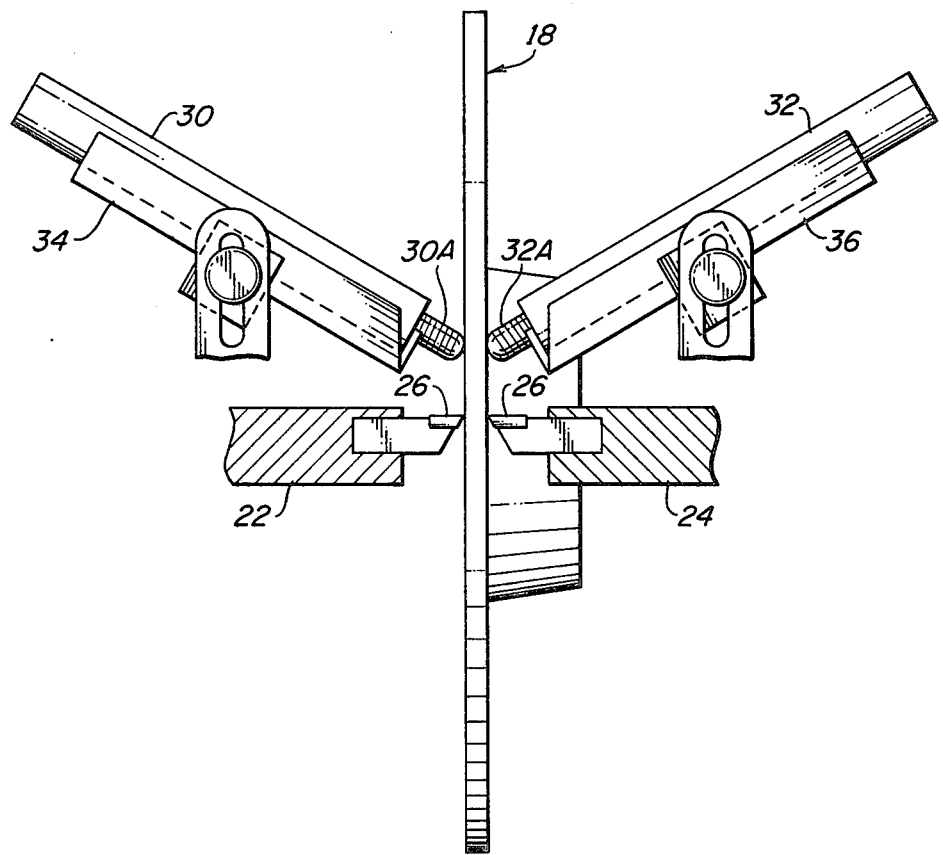

METHOD AND APPARATUS FOR DAMPENING VIBRATIONS DURING TURNING OF A ROTOR

The present invention relates in general to methods and apparatus for inhibiting vibrations in a rotor, and it relates in particular to a new and improved method and apparatus which is suited for use with a lathe during the surfacing of brake discs and during other metal removal operations.

BACKGROUND OF THE INVENTION

One of the most difficult operations in a machine shop is that of machining flat faces on thin discs such as those used in automotive brakes. In the case of brake discs, for example, it was a common practice to subject the faces of the discs to a grinding operation to provide the relatively flat surfaces required to meet manufacturer's specifications and to provide good braking. More recently, such a grinding operation has in many cases been replaced by a machining operation carried out with the aid of a vibration dampener such as that described in U.S. Pat. No. 3,691,878. Although that vibration dampener is satisfactory for many operations, it has its limitations. For example, attempts to resurface very thin stainless steel discs have not been entirely successful since some noticable vibration or chatter is present and causes an irregularity in the disc surfaces. There is, therefore, a need for an improved vibration dampener which may be adapted for use with thin brake discs during machining of the surfaces thereof.

SUMMARY OF THE INVENTION

Briefly, there is provided in accordance with one aspect of the invention a vibration dampening method and apparatus in which a pair of dampener members are slidably supported in inclined tracks on opposite sides of the disc so that the members abut the disc in proximity to the tool bits and are held against the disc by the force of gravity. Preferably, the portions of the dampener members which abut the disc are formed of a soft metal or other material which is slowly eroded by the disc during use. The tracks are adjustably mounted so that the angles of inclination and the respective locations of the dampener members can be optimized for each particular application. I have found, however, that the points of abutment should be as close to the tool bits as possible and located directly opposite to one another.

GENERAL DESCRIPTION OF THE DRAWINGS

The present invention will be better understood by a reading of the following detailed description taken in connection with the accompanying drawings wherein:

FIG. 3 is a view taken from the front of the lathe of FIG. 1 and particularly showing the vibration dampener of the invention.

DETAILED DESCRIPTION OF THE INVENTION

Figure 1:
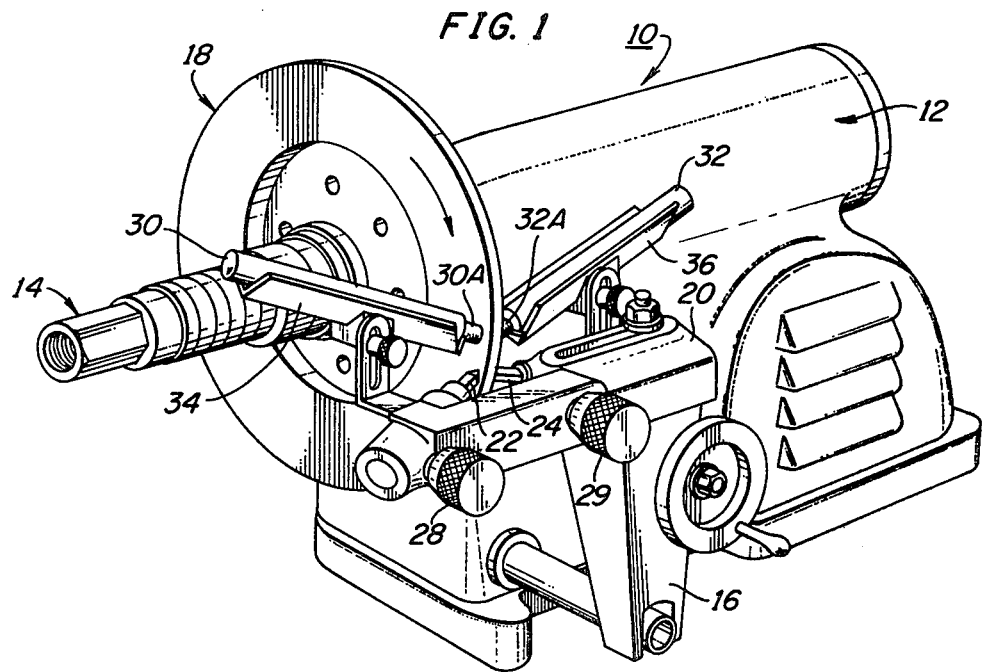
FIG. 1 is a perspective view of a lathe being used in the surfacing of an automotive brake disc and incorporating a preferred embodiment of the present invention.
Figure 2:
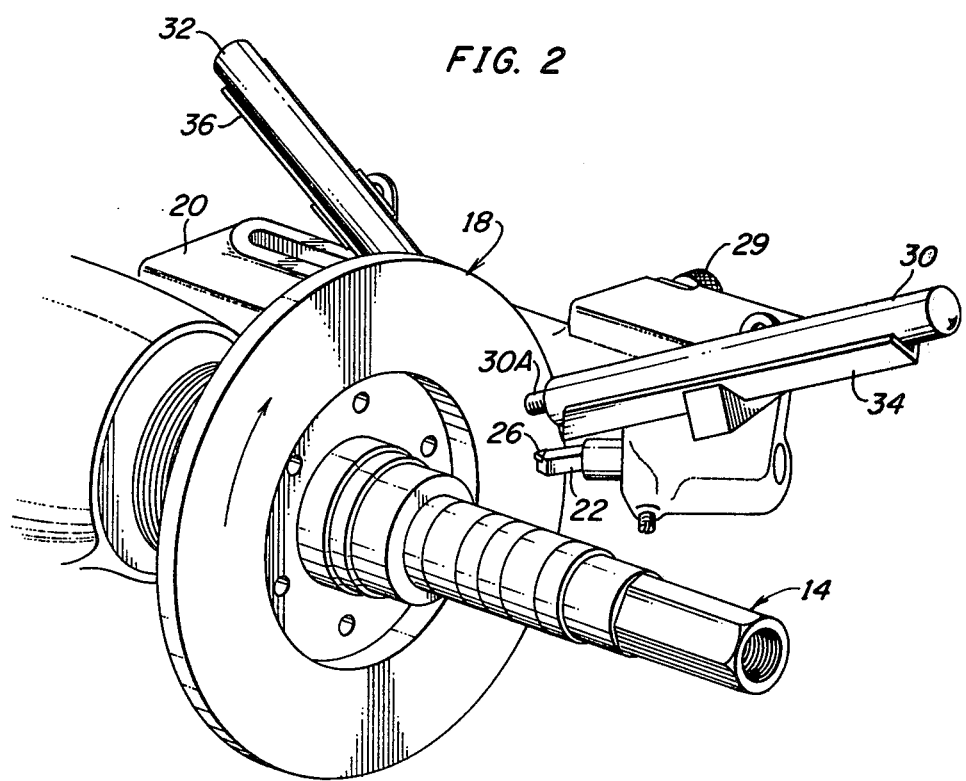
FIG. 2 is an enlarged view of a portion of the lathe of FIG. 1 as seen from the rear of the lathe as shown therein.

Referring to the drawings, a lathe 10 includes a main frame or housing 12, a spindle 14 for carrying a work piece, such as a disc, and a crossfeed assembly 16. As shown, a relatively thin brake disc 18 is mounted on the spindle 14 for rotation relative to a pair of cutting tools 22 and 24 carried by a tool holder 20 mounted to the crossfeed assembly. The tools 22 and 24 each carry a respective tool bit 26 which is adapted to engage and remove metal from the opposing faces of the disc 18. The tool holder 20 is mounted for adjustment in a direction parallel to the axis of the spindle 14, and the positions of the tools 22 and 24 are adjustable by means of vernier adjustment knobs 28 and 29 to vary the depth of cut as the tool bits traverse the faces of the discs. As thus far described, the lathe and crossfeed assembly are well known in the art and are manufactured by Ammco Tools, Inc., the assignee of the present invention.

In order to prevent the disc 18 from vibrating during a metal removing operation wherein the faces of the disc are being surfaced, it is well known that some method of vibration dampening must be employed. In an operation where only one face of the disc is resurfaced at one time, vibration dampeners of different constructions have been mounted to the opposite face of the disc with good results. Where a relatively thick disc is being resurfaced, good results have been achieved by wrapping an annular dampener around the periphery of the disc. Neither of these dampening approaches are, however, adaptable to operations where both faces of thin discs are resurfaced simultaneously.

In accordance with the present invention a pair of vibration dampener members 30 and 32 are freely and slidably supported in respective ones of a pair of troughs 34 and 36 and move under the force of gravity against opposite faces of the disc 18 in proximity to the location of the tool bits 26. The body portions of the dampener members 30 and 32 are solid cylindrical metal bars, and disc engaging wear members 30A and 32A are mounted in the body members at the lower ends. The wear members 30A and 32A, which may be formed of a soft metal such as brass, are gradually abraded away by the adjacent face of the disc. The members 30A and 32A may be a machinable plastic if desired.

The angles of inclination and the vertical positions of the troughs 34 and 36 are adjustable to assure maximum dampening. Preferably, the dampener members should abut the disc at locations directly opposite one another and as close as possible to the tool bits without interfering with the actual removal of the metal or with the removed metal ribbon. The angle of inclination should be no greater than that required to reduce vibration of the disc 18 below an unsatisfactory level. An angle of 30° is satisfactory.

It may be seen from an inspection of the drawings that the troughs 34 and 36 are positioned so that the rotation of the disc 18 forces the members 30 and 32 against the bottoms of the respective troughs. Nevertheless, the dampener members 30 and 32 are free to move should they be contacted by high spots, nicks or the like on the disc faces.

It will be seen that inasmuch as the vibration dampener of the present invention is carried by the crossfeed assembly it moves in unison with the tool bits 26 as the bits move radially across the faces of the disc. Since the vibration waves originate at the locations of the tool bits, it is believed that the effectiveness of the herein described dampening method and apparatus results from the fact that the vibrational waves are dampened before harmonic vibrations are developed. Using the above described apparatus we have resurfaced stainless steel brake discs having a thickness of less than one-sixteenth of an inch, and the resurfaced faces were comparable if not better than the faces on the discs when originally produced.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of dampening vibrations in
   a rotating disc having at least
   one external planar face, comprising movably supporting a rigid dampener member
   for disposition solely by the force of gravity against said face.

2. A method according to claim 1 wherein
   said rotating disc has a second external planar face parallel to said one face and further comprising
   movably supporting another dampener member for disposition solely by the force of gravity against said second face of said disc.

3. A method according to claim 2 wherein
   said dampener members are positioned so as to abut said faces at substantially mutually opposite positions.

4. A method of dampening vibrations in a rotating disc, comprising
   positioning a track adjacent one face of said disc with said track inclined downwardly toward said disc, and
   disposing a dampener member for free sliding movement along said track,
   whereby vibrational forces developed in said disc are dampened by said dampener member.

5. The method according to claim 4
   wherein the method is carried out while said disc is being machined by a tool bit, comprising
   causing said dampener member to abut said disc in proximity to said tool bit.

6. A method of dampening vibrations according to claim 4 wherein
   said dampener member is urged by said rotating disc against the bottom of said track.

7. Apparatus for dampening vibration of a rotating disc, comprising
   a track mounted adjacent said disc and extending downwardly at an incline toward one face of said disc,
   a dampener member mounted for free movement along said track under the force of gravity against said face of said disc.

8. Apparatus for dampening vibration of a rotating disc, comprising
   a track mounted adjacent said disc and extending downwardly toward one face of said disc,
   a dampener member mounted for free movement along said track under the force of gravity against said face of said disc,
   said dampener member comprising a rigid elongated member having a disc abutting portion formed of a material which is softer than said disc.

9. Apparatus according to claim 8 wherein
   said elongated member is a solid metal rod.

10. A method of dampening vibrations in a rotating disc, comprising
    mounting a dampener member adjacent said disc for free gravitational movement against and away from one face of said disc,
    whereby vibrational forces developed in said disc are absorbed, and the vibrations are dampened by the movement of said member away from the central plane of said disc.

11. A method according to claim 10 and further comprising
    mounting another dampener member adjacent said disc for free gravitational movement against and away from the other face of said disc.

* * * * *